(12) United States Patent
Wallace et al.

(10) Patent No.: US 9,022,320 B2
(45) Date of Patent: May 5, 2015

(54) AIRCRAFT PASSENGER SUITE WITH COMBINATION BED

(71) Applicant: B/E Aerospace, Inc., Wellington, FL (US)

(72) Inventors: Andrew Gordon Wallace, Nr. Newent (GB); Paul Benedict Rutter, Warwick (GB); Andrew David Mitchell, Leamington Spa (GB); Tommy George Plant, Advance, NC (US); Alexander Nicholas Pozzi, Winston-Salem, NC (US)

(73) Assignee: B/E Aerospace, Inc., Wellington, FL (US)

( * ) Notice: Subject to any disclaimer, the term of this patent is extended or adjusted under 35 U.S.C. 154(b) by 129 days.

(21) Appl. No.: 13/799,428

(22) Filed: Mar. 13, 2013

(65) Prior Publication Data

US 2013/0241247 A1 Sep. 19, 2013

Related U.S. Application Data

(60) Provisional application No. 61/610,521, filed on Mar. 14, 2012, provisional application No. 61/610,529, filed on Mar. 14, 2012.

(51) Int. Cl.
*B64D 11/06* (2006.01)
*B64D 11/00* (2006.01)

(52) U.S. Cl.
CPC ............ *B64D 11/06* (2013.01); *B64D 11/0606* (2014.12); *B64D 2011/0069* (2013.01); *B64D 11/0641* (2014.12); *B64D 11/0604* (2014.12)

(58) Field of Classification Search
USPC ............ 244/118.5, 118.6, 121; 105/316, 322; 5/9.1; 297/115
See application file for complete search history.

(56) References Cited

U.S. PATENT DOCUMENTS

| | | | |
|---|---|---|---|
| 7,517,010 B2 * | 4/2009 | Saint-Jalmes et al. | 297/118 |
| 8,313,060 B2 * | 11/2012 | Darbyshire | 244/118.6 |
| 2009/0166470 A1 * | 7/2009 | Dryburgh et al. | 244/118.6 |
| 2009/0302158 A1 * | 12/2009 | Darbyshire et al. | 244/118.6 |

FOREIGN PATENT DOCUMENTS

FR 2935683 * 9/2008

* cited by examiner

*Primary Examiner* — Rob Swiatek
*Assistant Examiner* — Magdalena Topolski
(74) *Attorney, Agent, or Firm* — Shumaker, Loop & Kendrick, LLP

(57) ABSTRACT

An aircraft passenger suite including a seat configured for movement between an upright position and a horizontal bed position, an ottoman positioned apart from the passenger seat, and at least one armrest assembly configured for vertical movement, wherein the seat, ottoman and at least one armrest reside in horizontal alignment to form a bed in the horizontal bed position.

29 Claims, 8 Drawing Sheets

AIRCRAFT PASSENGER SUITE WITH COMBINATION BED

CROSS-REFERENCE TO RELATED APPLICATIONS

This application claims priority to U.S. Application No. 61/610,521 filed Mar. 14, 2012 and U.S. Application No. 61/610,529 filed Mar. 14, 2012, the contents of which are incorporated by reference herein.

TECHNICAL FIELD AND BACKGROUND OF THE INVENTION

This invention relates generally to premium class aircraft passenger seating, and more particularly, to an aircraft passenger suite with a defined passenger living area, wherein the seat and other surfaces within the suite adjust to cooperatively form a bed that occupies substantially the entirety of the floor space of the passenger living area.

Long haul international air carriers typically provide three classes of service for passengers: coach class, which accommodates the large majority of passengers at a relatively low fare and with minimal amenities; business class, which accommodates a relatively smaller number of higher fare-paying passengers with more amenities; and premium class, which accommodates relatively few passengers at relatively high fares with luxurious amenities, including premium food and beverages, large accommodation seating areas and the like. With the advent of larger long haul aircraft, more space is available for accommodating the travel preferences of premium class passengers who can afford to pay higher fares for more space, privacy and a more efficient work area.

Prior art long haul premium accommodations typically include a relatively large seat that moves through a wide range of motion between a full upright position for take-off, landing and dining, a partial recline relaxation position, and full recline position in which the seat back, seat bottom and footrest extend into a generally lie-flat, recumbent configuration to form a bed. In these seating units, the size of the bed is limited by the combined total surface area of the seat back, seat bottom and leg rest. Thus, the bed typically has a narrow width and short length that limits movements of the passenger and requires the passenger to sleep in only one orientation. Further, because only the seat is used to form the bed, hard surfaces adjacent the seat are left exposed, thereby decreasing sleeping comfort should the passenger come into contact with such surfaces. Prior art long haul premium accommodations typically only offer a degree of privacy, which further decreases sleeping comfort.

Accordingly, what is needed is a premium class passenger suite that overcomes the disadvantages of prior art premium accommodations in that sleeping comfort and privacy of the passenger is greatly enhanced.

SUMMARY OF THE INVENTION

It is therefore an object of the present invention to provide a premium class aircraft passenger suite bed with a large surface area for enhancing passenger sleeping comfort.

It is a further object of the invention to provide a premium class passenger suite in which a plurality of surfaces within the suite adjust to cooperatively form a large bed.

It is a further object of the invention to provide a premium class passenger suite that offers total privacy for a sleeping passenger.

It is a further object of the invention to provide premium class passengers suites that nest to maximize suite density in premium class in an aircraft.

These and other objects and advantages are achieved by providing an aircraft passenger suite including a seat having a seat back and a seat bottom configured for movement between an upright seating position and a horizontal bed position, an ottoman positioned apart from the passenger seat that serves as a foot rest when the seat is in the seating position and a bed surface when the seat is in the horizontal bed position, and a first armrest assembly positioned alongside the seat, the first armrest assembly including an armrest and an armrest housing in which the armrest is mounted for movement between an upper horizontal armrest position and a lower horizontal bed position, wherein the seat back, the seat bottom, the ottoman and the first armrest assembly reside in horizontal alignment to form a bed when the seat is in the horizontal bed position and the first armrest assembly is in the lower horizontal bed position.

In accordance with a further embodiment of the invention, the suite may include a second armrest assembly positioned alongside the seat, the second armrest assembly including an armrest and an armrest housing in which the armrest is mounted for movement between an upper horizontal armrest position and a lower horizontal bed position, and a planar bed extension having an upper bed surface, and mounted in the armrest housing for movement between a stowed position wherein the bed extension is contained in a vertical position in the armrest housing and a deployed position wherein the bed extension is positioned exterior to the armrest housing in a raised, horizontal position with the bed surface in horizontal alignment with the upper horizontal surface of the armrest, wherein the armrest and the planar bed extension of the second armrest assembly reside in horizontal alignment with the seat back, the seat bottom, the ottoman and the armrest of the first armrest assembly when the armrest of each of the first and second armrests assemblies is in the lower horizontal bed position and the bed extension is raised.

In accordance with a further embodiment of the invention, the suite may include partition walls defining a passenger living area, wherein the seat back, seat bottom, ottoman, armrests and bed extension cooperatively form a bed that occupies substantially the entirety of the passenger living area when the seat back, seat bottom, armrests and bed extension are in horizontal bed positions.

In accordance with a further embodiment of the invention, the suite may include a closet positioned alongside the second armrest assembly.

In accordance with a further embodiment of the invention, the suite may include a video monitor positioned in a partition wall forward of the seat.

In accordance with a further embodiment of the invention, the bed extension may be mounted for movement on a horizontal linear slide by which the bed extension is ejected out of a front opening of the armrest for deployment.

In accordance with a further embodiment of the invention, an interconnection between the armrest and the bed extension may first deploy the bed extension from the armrest housing, and thereafter may move the armrest from the vertical position to the raised, horizontal position.

In accordance with a further embodiment of the invention, each of the first and second armrests may move vertically relative to their respective housings along linear slides.

In accordance with a further embodiment of the invention, the suite may further include a privacy screen slidable between an open and closed position to open and close an opening to the suite.

In accordance with a further embodiment of the invention, the privacy screen may include lighting elements controllable to provide a desired degree of illumination and color to the privacy screen.

In accordance with a further embodiment of the invention, the privacy screen may be translucent.

In accordance with a further embodiment of the invention, two or more like aircraft passenger suites may be arranged in a nested arrangement to form a column.

According to another embodiment of the invention, provided herein is an aircraft passenger suite including a combination bed cooperatively formed by a seat including a seat back and a seat bottom that are movable between an upright seating position and a horizontal bed position, an ottoman positioned apart from the seat back for expanding a surface area of the horizontal bed position of the seat when the seat is in the horizontal bed position, a first armrest assembly positioned alongside the seat, the first armrest assembly including an armrest mounted for vertical movement relative to a housing, the armrest residing in horizontal alignment with the seat back and the seat bottom when the armrest is fully lowered and the seat is in the horizontal bed position, and a second armrest assembly positioned alongside the seat, the second armrest assembly including an armrest mounted for vertical movement relative to a housing, the armrest residing in horizontal alignment with the seat back and the seat bottom when the armrest is fully lowered and the seat is in the horizontal bed position, the second armrest assembly further including a bed extension deployable therefrom that resides in horizontal alignment with the seat back and seat bottom when the seat is in the horizontal bed position, wherein the seat back, seat bottom, ottoman, armrests and bed extension form a substantially continuous planar bed surface in the horizontal bed position.

In accordance with a further embodiment of the invention, the bed extension may have an upper bed surface and mounts in the armrest housing for movement between a stowed position wherein the bed extension is contained in a vertical position in the armrest housing and a deployed position wherein the bed extension is positioned exterior to the armrest housing in a raised, horizontal position.

In accordance with a further embodiment of the invention, the suite may include a privacy screen positioned along an aisle side of the suite configured to slide between open and closed positions to provide privacy to the suite.

In accordance with a further embodiment of the invention, the privacy screen may be translucent and include lighting elements controllable to provide a desired degree of illumination and color to the privacy screen.

In accordance with a further embodiment of the invention, the suite may be defined by a plurality of walls defining a suite living area, and wherein the seat back, seat bottom, ottoman, armrests and bed extension cooperatively form a substantially continuous, horizontal bed in a horizontal bed seating position.

Embodiments of the present invention may include one or more or any combination of the above features.

BRIEF DESCRIPTION OF THE DRAWING FIGURES

The present invention is best understood when the following detailed description of the invention is read with reference to the accompanying drawings, in which.

DESCRIPTION OF THE PREFERRED EMBODIMENT AND BEST MODE

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
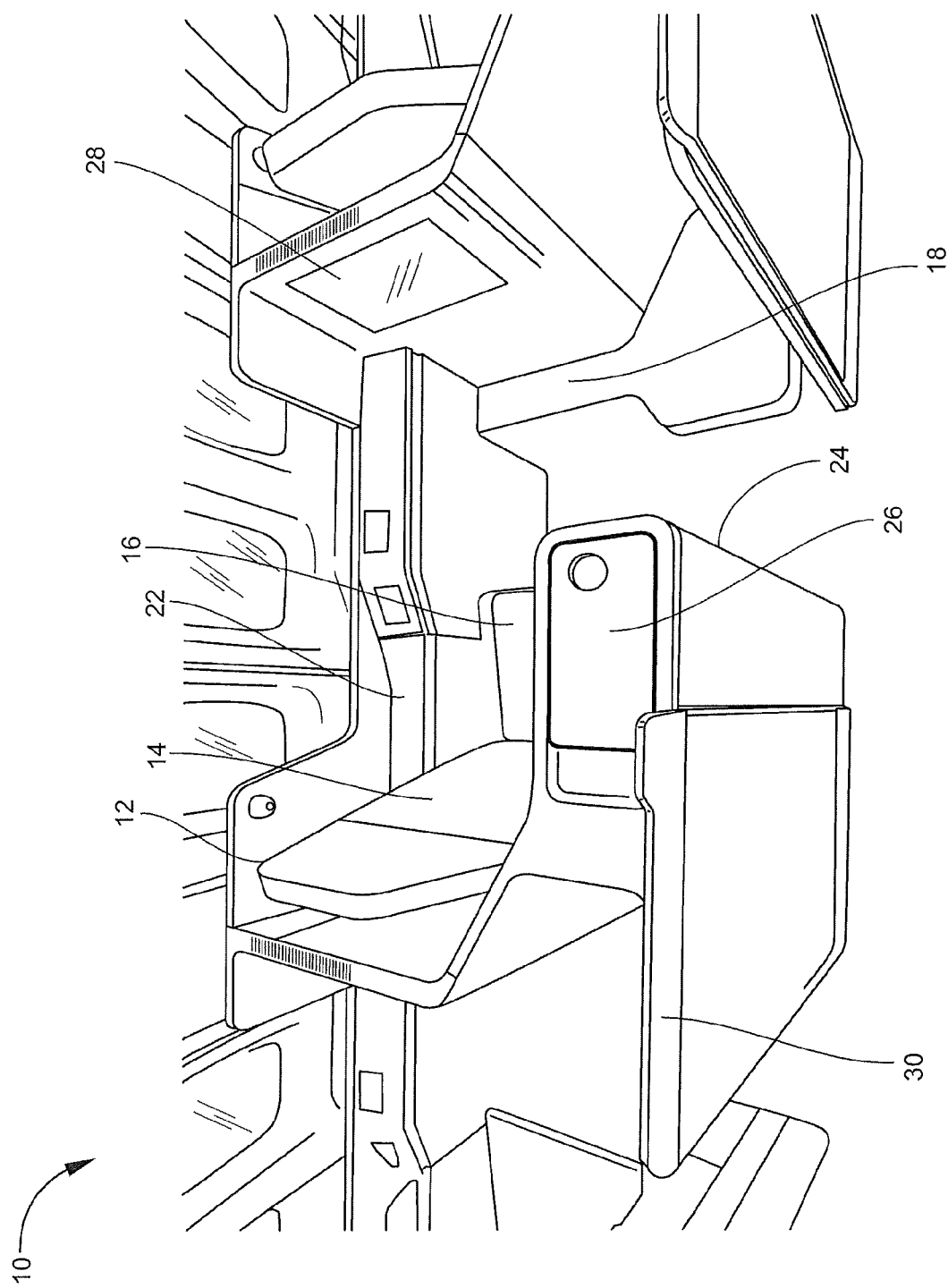
FIG. 1 is an overhead perspective view of a nested passenger suite according to a preferred embodiment of the invention.

Referring now to the drawings, a premium class aircraft passenger suite is shown generally at reference numeral 10. The suite 10 may be deployed in a premium class section of a commercial aircraft, and is configured to nest with other like suites as shown in FIG. 1. As shown, the suite 10 is arranged with the longitudinal axis of the seat generally parallel to that of the aircraft, although other orientations are envisioned. Multiple suites may be arranged end-to-end to form a column of suites. Suites may be arranged against one or more of the interior walls of the cabin. Suites may also be arranged about the centerline of the aircraft depending upon the width of the aircraft. Adjacent parallel columns are separated by an aisle for movement throughout the cabin and to facilitate ingress and egress from the suites.

The suite seat 12 is a lie-flat capable seat including a seat back 14 and seat bottom 16 configured to selectively move between an upright taxi, take-off and landing position and a horizontal lie-flat position in which the seat back 14 and seat bottom 16 cooperatively form a generally flat planar bed surface. Movement of the seat may be accomplished through conventional mechanisms. The seat 12 is positioned at one corner of the suite and an ottoman 18 is provided along the forward wall, with a wide portion of the ottoman being located at the opposing corner from the seat. The wide portion of the ottoman 18 may serve as a temporary seat for a suite visitor. Right and left armrest assemblies 20, 22 are positioned alongside the seat 12 and are configured to adjust vertically to form bed expansion portions as described below.

A closet 24 is positioned alongside the right side armrest 20 along the aisle and is configured for storage, housing suite controls, providing a working surface 26, etc. The closet 24 also defines a portion of the aisle wall. A video monitor 28 is mounted on the forward partition wall directly in front of the seat for the optimum viewing angle.

Partition walls surround the suite and define the passenger living area or space. Included in the passenger living area is the seat 12, closet 24, ottoman 18, armrests 20, 22 and floor space, among other amenities. The parition can include multiple walls arranged to form one continuous wall with the exception of the suite opening. Walls of one suite may serve as walls of an adjacent suite. For example, the rear parition wall of one suite may serve as the forward partition wall of the adjacent suite. The partition walls extend from the floor to a height about equal to the top of the seat back 14 in the upright position. Wall height may be increased or decreased when designing the suite to enhance or relax privacy.

The distance from the seat 12 to the ottoman 18 is greater than the distance from the closet 24 to the video monitor 28. In this arrangement, pockets are created for each of the seat 12 and the ottoman 18 to enhance passenger comfort and privacy. Moving the seat 12 slightly rearward with respect to the closet 24 also allows the passenger to make full use of the closet when the seat is in either the upright or bed configurations.

The opening to the suite is provided along the closet side of the suite and opens into the aisle to facilitate ingress/egress. As shown, a walkway is provided between the closet 24 and the ottoman 18. A door, such as a frosted translucent privacy screen 30, slides alongside the aisle side of the suite between open and closed positions, separating the suite from the remainder of the aircraft cabin. The entire suite 10 is enclosed by the privacy walls that cooperate with the privacy screen 30 to provide the suite occupant the desired degree of privacy. The privacy screen 30 may slide along a floor track or may be suspended from a wall track. The privacy screen 30 preferably has a nominal thickness so as to minimally protrude into the aisle.

Lights, such as, for example, light-emitting diodes, are mounted in or around one or more of the edges of the privacy screen 30 so that when they are illuminated, light is transmitted through the privacy screen providing colored illumination of the screen. The ability to auto-switch the color of the screen illumination depending on whether the screen is open or closed permits the passenger or the crew to select the color of illumination for the privacy screen to convey information, such as "do not disturb", "wake for next meal", "crew attention required", and the like. The color can also be locked to a particular color by the crew or automatically by a controller to indicate whether the privacy screen is open or closed.

The privacy screen 30 may be opaque, translucent or transparent. In any of these light-transmissive conditions, the privacy screen 30 is provided with Red/Green/Blue light sources, such as a RGB light-emitting diodes (LEDs). The LEDs are preferably controllable by the passenger to enable the passenger to change the degree of illumination, the color of the privacy screen 30, or to select messages that will display to the cabin crew. Similarly, the crew may be provided with the ability to relay messages to the sleeping passenger by the LEDs. The privacy screen 30 is not limited to the suite shown, and may be used with any suitable first or business class seating enclosure whether or not the other features described in this application are utilized.

Figure 2:
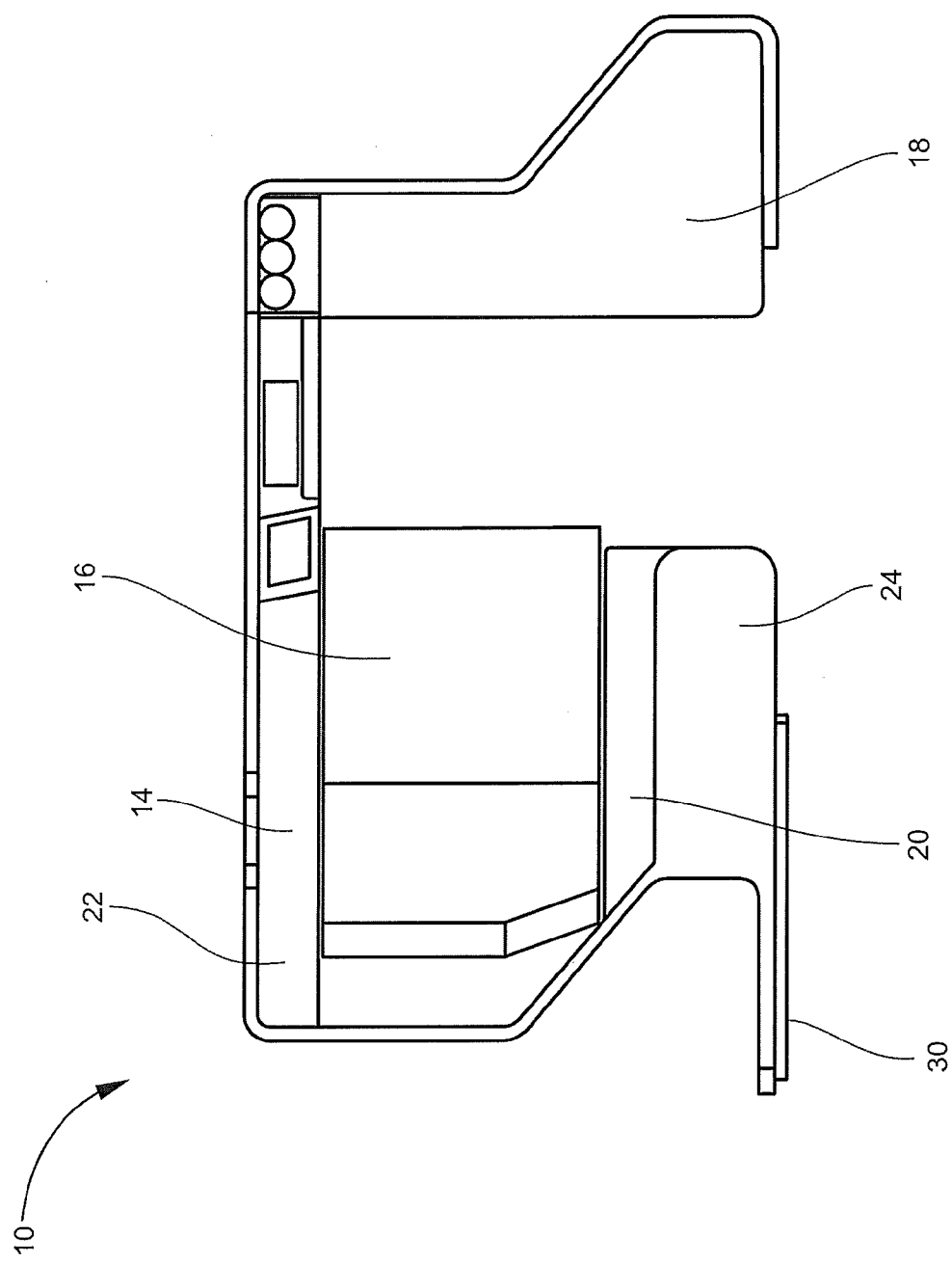
FIG. 2 is a top plan view of the suite of FIG. 1 shown with the bed stowed.

In the seating configuration, the seat 12 in an exemplary embodiment provides a seating pitch of 1.6 meters with the unit oriented generally along the longitudinal axis of the aircraft. This permits a conventional front-facing seating orientation that allows window viewing. The seat 12 converts from the seating configuration shown in FIGS. 1 and 2 into the sleeping configuration shown in FIGS. 3 and 4 by reclining the seat back 14 and seat bottom 16 to provide a significantly greater length dimension that permits even a relatively tall passenger to lie in a fully reclined position. The suite elements reconfigure into a bed having a configuration collectively formed of the seat back 14, seat bottom 16, armrest assemblies 20, 22, ottoman 18 and bed extension 32. In an exemplary embodiment, the bed provides a 2.1 meter recline length while increasing the full seat width except in the head and foot areas where less width is needed. This is accomplished by lowering the armrest assemblies 20, 22 to the same vertical level as the reclined seat back 14 and seat bottom 16. The bed extension 32 is stowed in the right armrest assembly 20 in the seating orientation and extends outward and upward to provide additional width in the torso and upper leg areas of the bed, as shown in FIG. 3.

Figure 5:
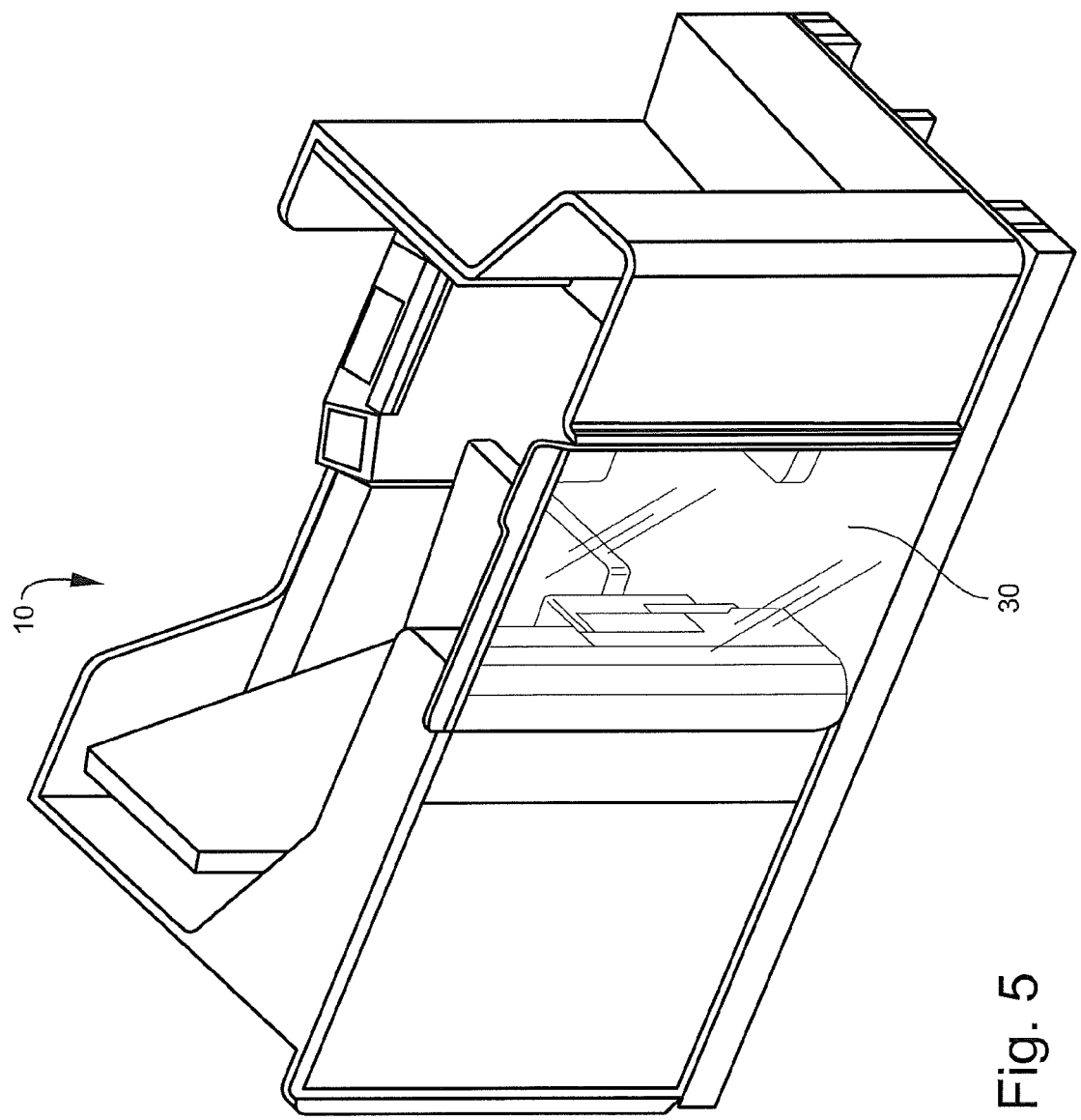
FIG. 5 is a side and top perspective view of the suite of FIG. 1 shown with the suite entry door closed.

The reconfiguration between seating and sleeping positions can be accomplished quickly and without disturbing adjacent passengers. The seating and sleeping positions are completely independent from seat to seat, so that any combination of passengers can be traveling in either the seating position or in the sleeping position. Also, greater utilization of space can be achieved with all passengers seated in the forward-facing direction in contrast to many previous configurations where increased space utilization is achieved by alternating seat-facing direction. As shown in FIG. 5, the privacy screen 30 can be slid towards the ottoman end of the suite 10 to provide additional privacy to the passenger in either the seated position or the sleeping position.

Figure 3:
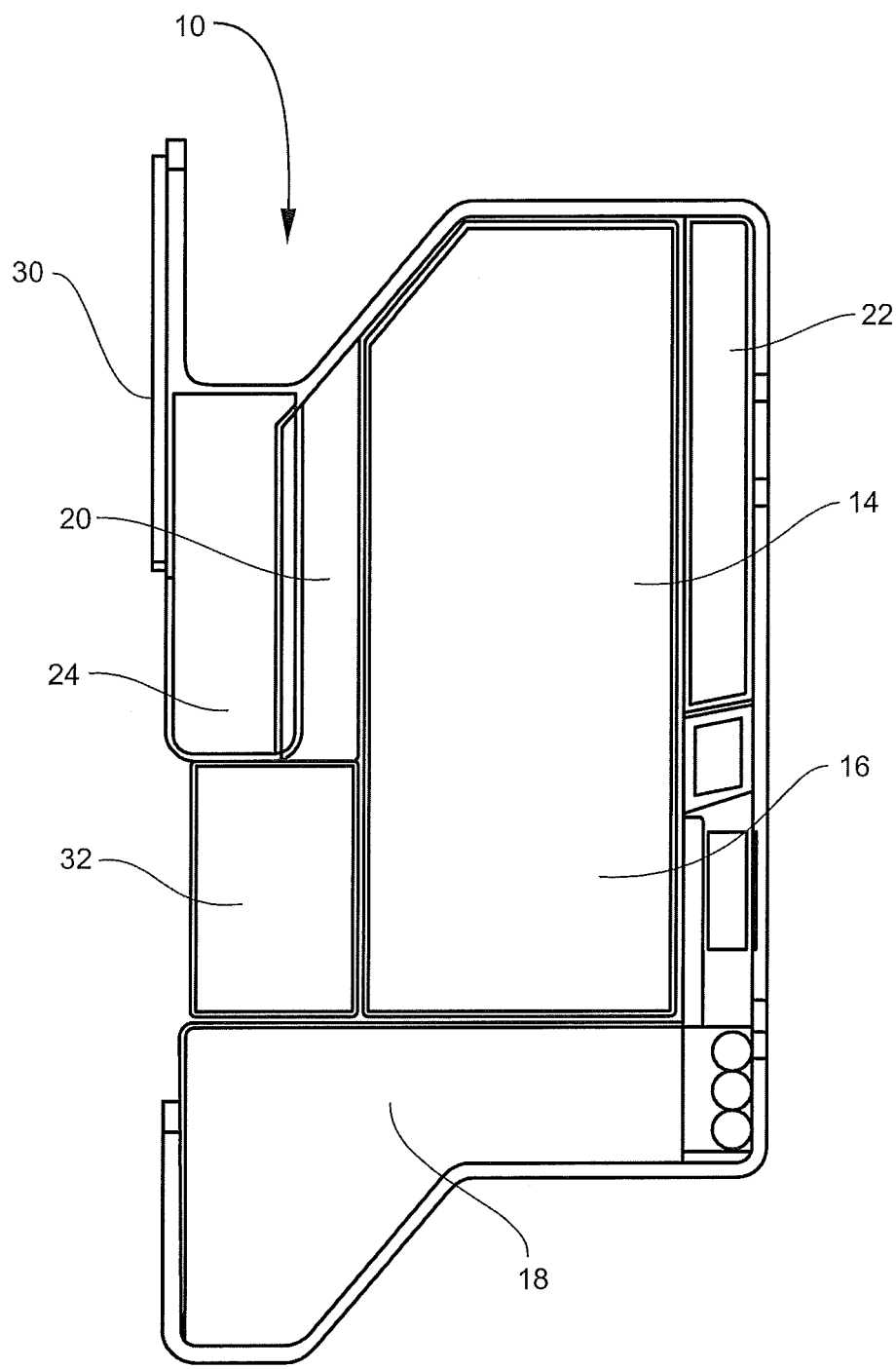
FIG. 3 is a top plan view of the suite of FIG. 1 shown with the bed deployed.
Figure 4:
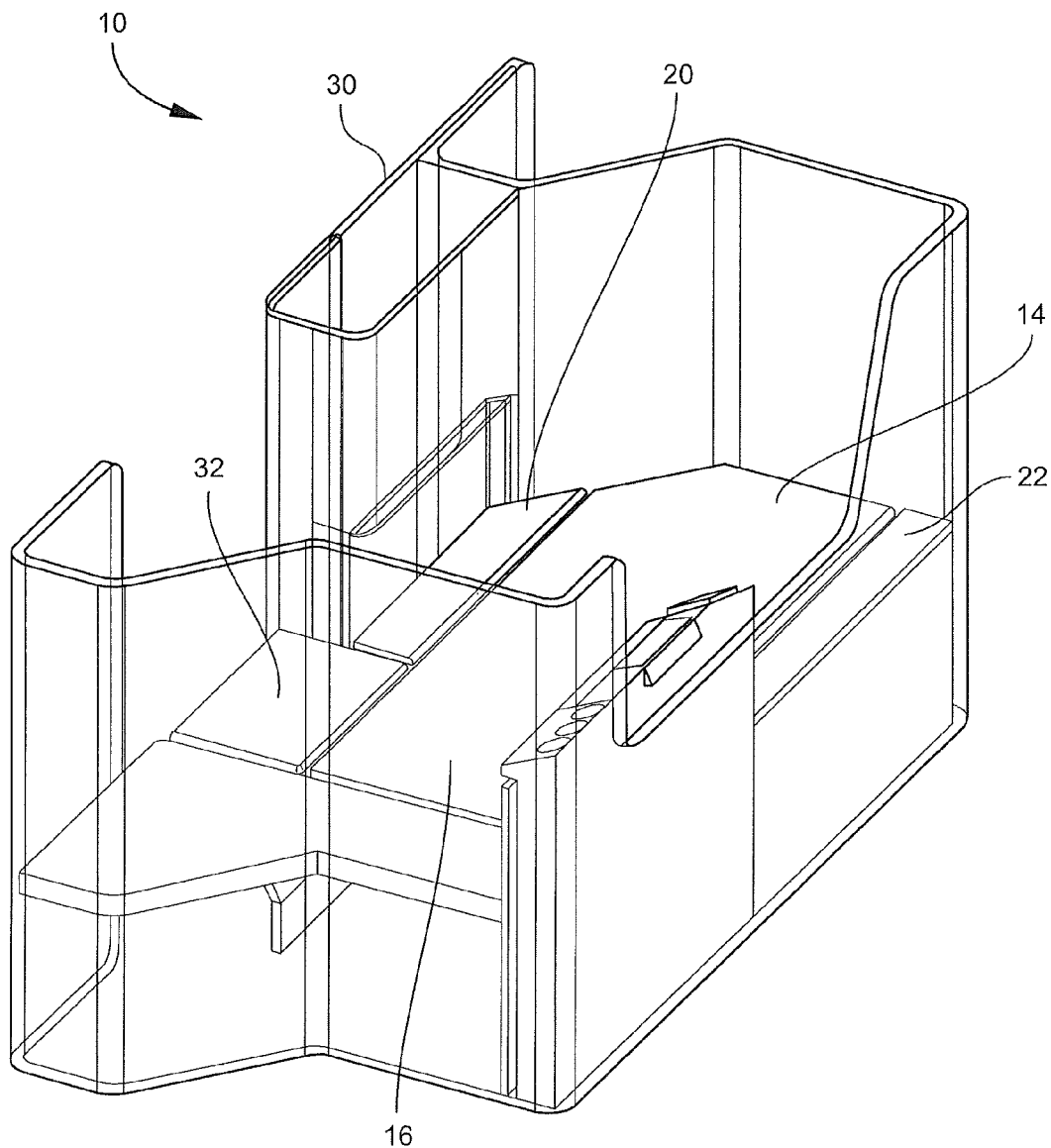
FIG. 4 is a perspective view of the suite of FIG. 1 shown with the suite-defining partition walls transparent to illustrate the bed.

In the bed configuration shown in FIGS. 3 and 4, the suite elements including the seat 12, ottoman 18, right and left armrest assemblies 20, 22, and bed extension 32 reconfigure to cooperatively form a bed with a large surface are. The suite elements effectively flood or cover the entire floor space of the suite. This large bed surface provides greater shoulder and hip width and length as compared to a conventional lie-flat seat, and allows the sleeping passenger freedom to move, roll over and change sleeping orientations, thereby enhancing sleeping comfort. By reconfiguring the suite elements to form a bed that effectively covers the suite, hard surfaces adjacent the seat are minimized and openings and gaps through which bed articles and other articles can fall to the floor are eliminated.

Referring to FIGS. 6-10, the right armrest assembly 20 has an armrest 34 that, in the seating configuration, serves the usual purpose of providing a rest on which the passenger can place an arm. The armrest assembly 20 includes an armrest housing 40 into and out of which the armrest assembly 20 is adapted to vertically move, as described in further detail below. The armrest 34 is mounted on vertical slide rails 42, 44. Cable pulleys 46 guide a counterbalance cable. A speed controller rack 50 prevents excessively-rapid deployment, and a horizontal linear slide 52 provides the means by which the bed extension 32 is ejected out of the front of the armrest housing 40.

A push button control 54 on the top of the armrest assembly 20 is depressed to deploy the bed extension 32. The armrest assembly 20 also includes a rotary damper/speed controller 56, horizontal slider final damper and end stop 58, a vertical slider counter balance spring 60 and a horizontal slider spring motor 62. The deployment of the bed extension 32 is manually operated by movement of the armrest assembly 20. To begin deployment, the passenger or flight attendant depresses the push button control 54 in the armrest 34, which releases a latch on the bed extension 32. The bed extension 32 is then driven forward by means of the spring motor 62, which is charged in the stowed position and releases to drive the bed extension 32 out of the armrest housing 40. The motion of the bed extension 32 is guided by the horizontal linear slide 52 and speed-controlled by the statically-mounted rotary damper/speed controller 56, which connected to the sliding bed extension 32 via the cable pulley 46 and the horizontal speed controller rack 50 on the underside of the mechanism.

Figure 7:
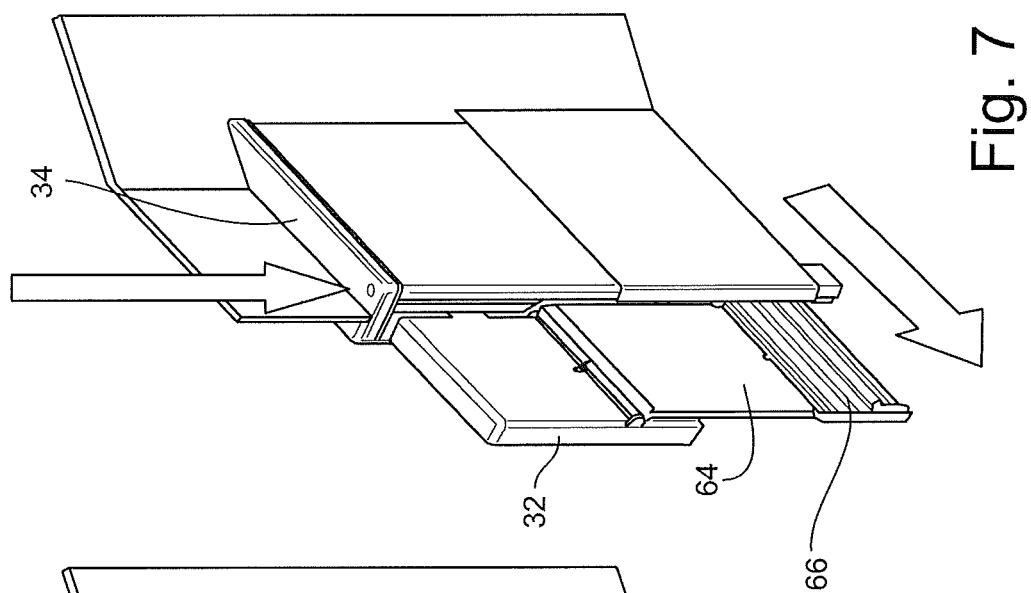
FIG. 7 is a simplified view of the armrest from the seat side showing the bed extension in its initial position as it is ejected in a vertical position from the right hand armrest.
Figure 6:
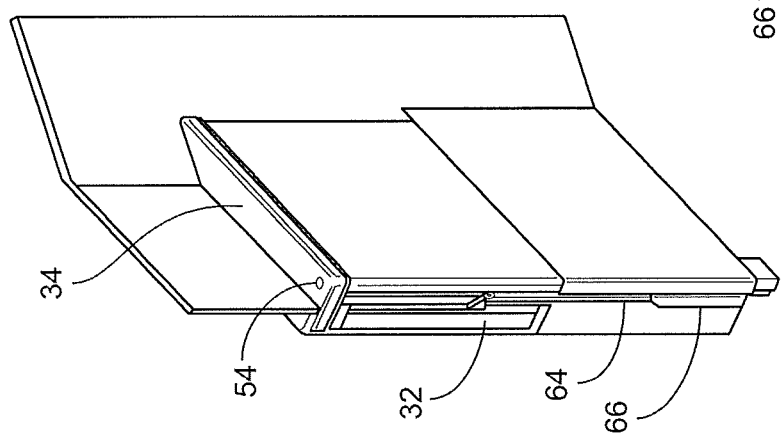
FIG. 6 is a simplified view of the armrest from the seat side showing the bed extension in its stowed position within a right hand armrest.
Figure 9:
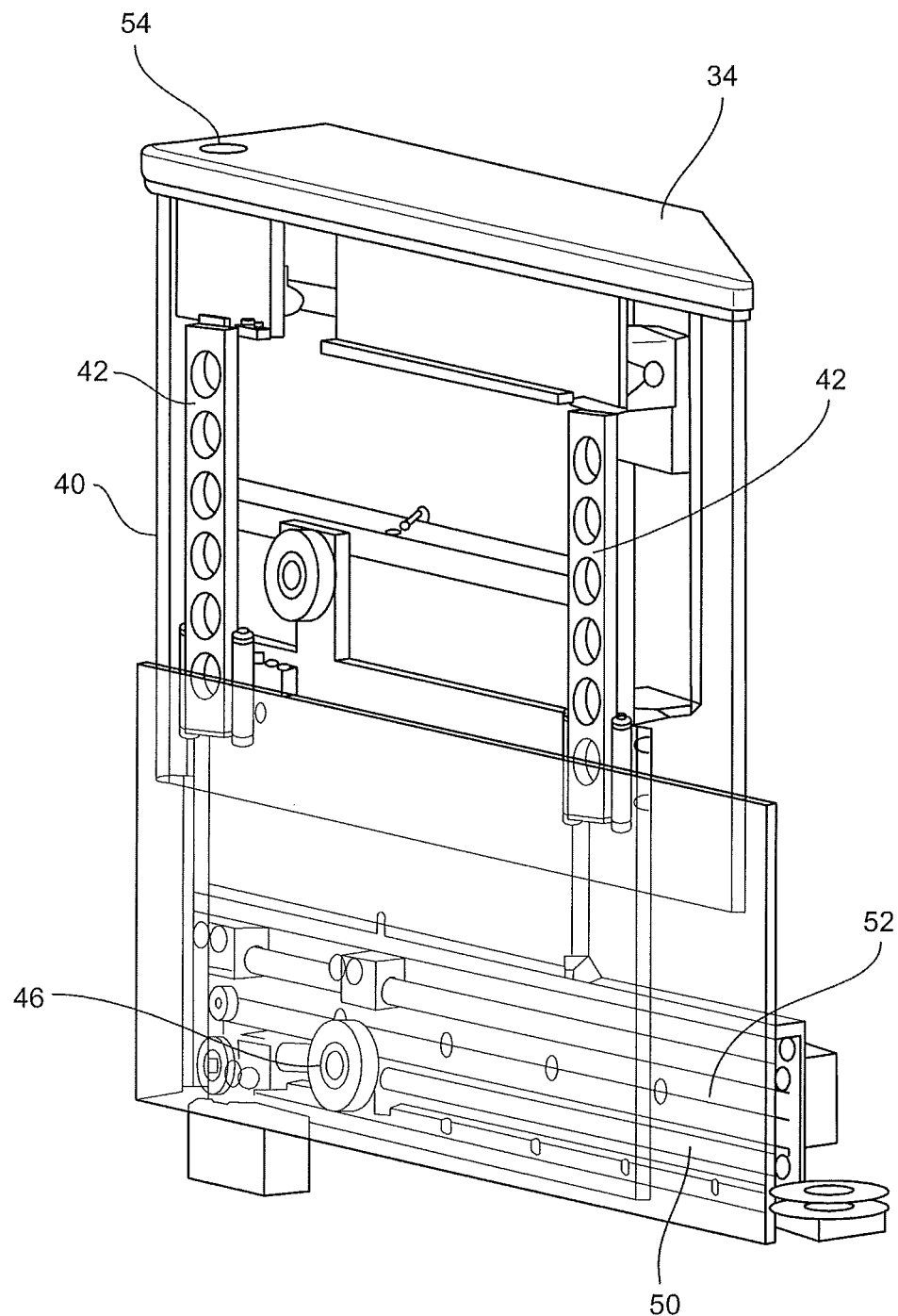
FIG. 9 is a side elevation with parts broken away for clarity of an armrest portion of a seating assembly, viewed from the seat side.
Figure 10:
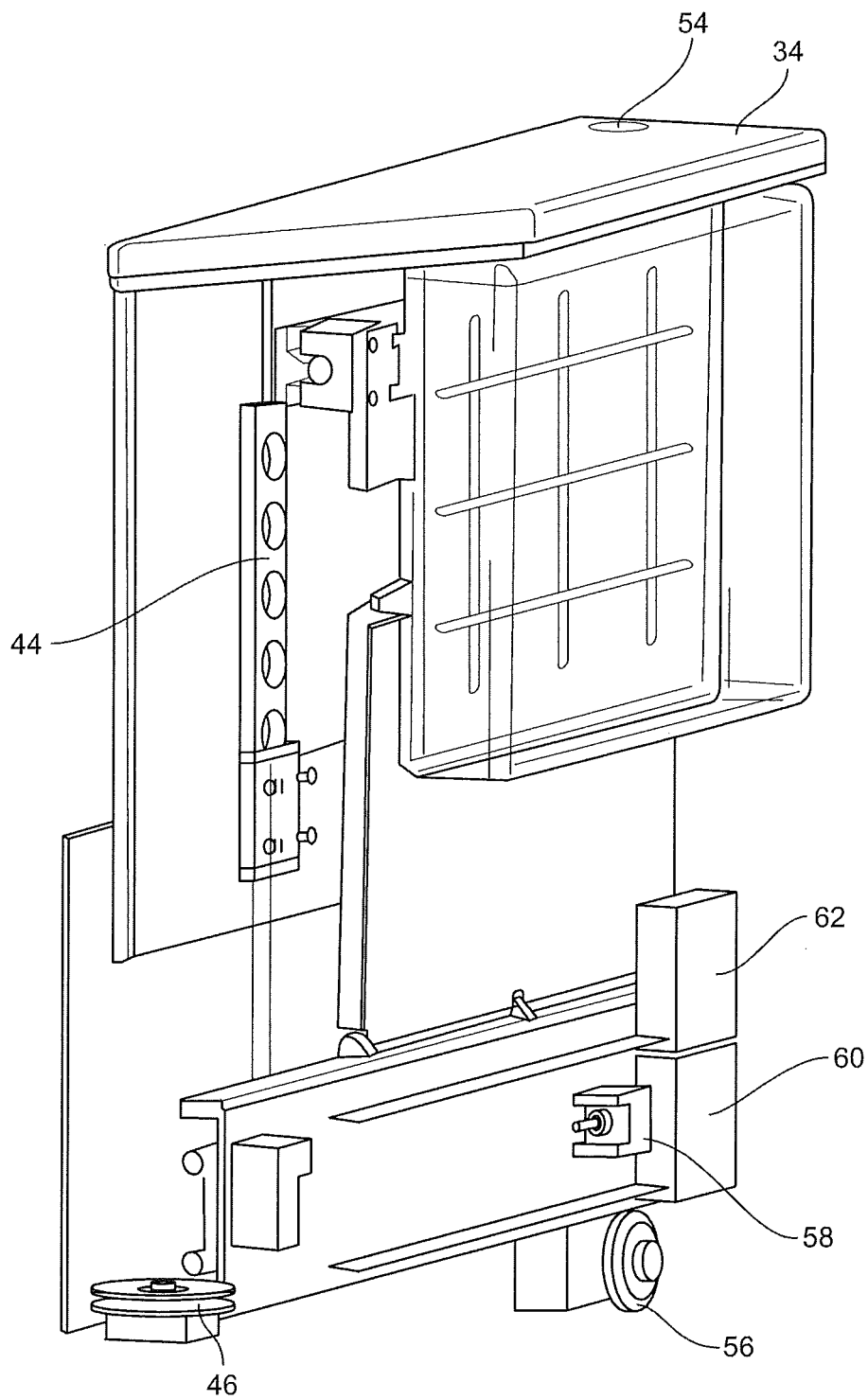
FIG. 10 is a side elevation with parts broken away for clarity of an armrest portion of a seating assembly, viewed from the aisle side.

Once the horizontal deployment of the bed extension 32 is complete, as shown in FIG. 7, the armrest 34 is unlocked automatically, allowing it to be pushed vertically downwards, until it latches in the fully down position. This action charges the vertical slider counter balance spring 60, which acts as a counter balance and is later used to return the armrest 34 to its upper position when the down latch is released.

Figure 8:
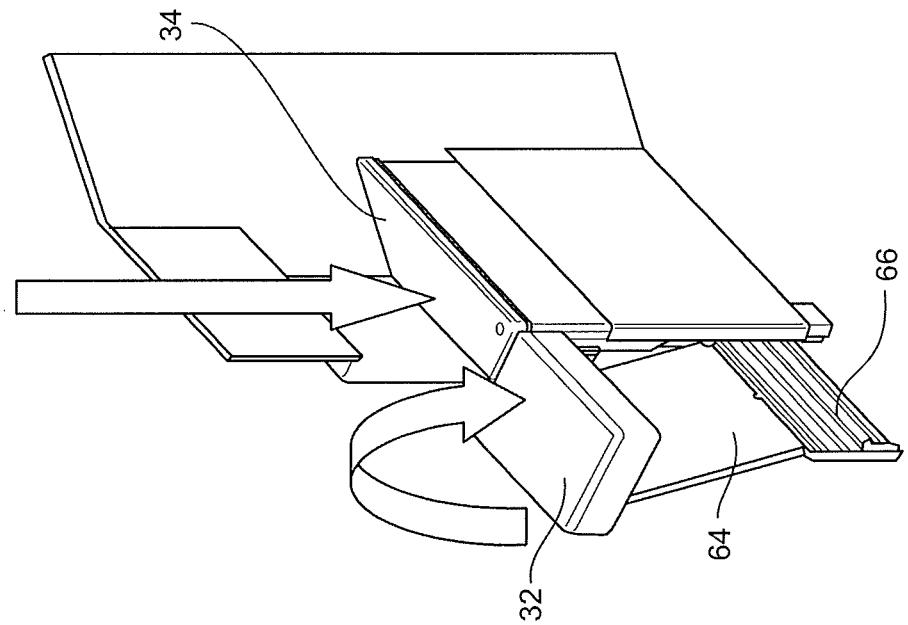
FIG. 8 is a simplified view of the armrest from the seat side showing the bed extension in its deployed position adjacent to and at the same horizontal level as the right hand armrest.

The downward motion of the armrest 34 into the armrest housing 40 also causes the bed extension 32 to rotate from the vertical to the horizontal orientation, as shown in FIG. 8. This is achieved by virtue of a hinged cantilever 64 that joins the bed extension 32 to a horizontal sliding carriage 66. As the armrest 34 moves down it also forces the bed extension 32 downwards as they are connected together by a slide rail and bearing arrangement. As it is driven downwards, the bed extension 32 is forced to rotate on bearings about the sliding carriage 66 by the geometry of the cantilever 64. The rotation ends once the bed extension is positioned in horizontal alignment with the armrest 34. As shown in FIG. 8, the cantilever 64 extends diagonally outward to support the outer edge of the bed extension 32.

In addition, the downward motion of the armrest 34 drives a support peg, not shown, out from under the ottoman 18 via a cable drive arrangement. This support peg extends under the cantilevered bed extension 32, providing extra support if needed.

To stow the bed extension 32, the armrest latch is released so that the armrest 34 is driven back to its uppermost position by the vertical slider counter balance spring 60. In so doing, it also retracts the support peg and rotates the bed extension 32 back into a vertical orientation. Finally, the passenger or flight attendant manually slides the bed extension 32 back into the armrest housing until it latches, recharging the vertical slider counter balance spring 60.

While the invention has been described with reference to armrest assembly 20, armrest assembly 22 may be provided with the same armrest functions and mechanisms as described above, and can be deployed in addition to or instead of the armrest assembly 20. See FIGS. 3 and 4. Note that armrest assembly 22 does not include a bed extension that operates together with the armrest. The bed extension 32 of armrest assembly 20 functions to fill the gap between the closet 20 and ottoman 18, and there is no such gap on the interior wall side of the suite.

A premium class passenger suite including a suite filling bed is described above. Various details of the invention may be changed without departing from the scope of the invention. Furthermore, the foregoing description of the preferred embodiment of the invention and the best mode for practicing the invention are provided for the purpose of illustration only and not for the purpose of limitation.

What is claimed is:

1. An aircraft passenger suite, comprising:
a seat including a seat back and a seat bottom configured for movement between an upright seating position and a horizontal bed position;
an ottoman, having a wide portion and a narrow portion, positioned apart from the passenger seat, the narrow portion serving as a foot rest when the seat is in the seating position, the wide portion serving as a secondary temporary seat when the seat is in the seating position, and both the wide portion and the narrow portion serving as a bed surface when the seat is in the horizontal bed position;
a first armrest assembly positioned alongside the seat, the first armrest assembly including an armrest and an armrest housing in which the armrest is mounted for movement between an upper horizontal armrest position and a lower horizontal bed position; and
a second armrest assembly positioned alongside the seat, the second armrest assembly comprising:
an armrest and an armrest housing in which the armrest is mounted for movement between an upper horizontal armrest position and a lower horizontal bed position; and
a planar bed extension having an upper bed surface, and mounted in the armrest housing for movement between a stowed position wherein the bed extension is contained in a vertical position in the armrest housing and a deployed position wherein the bed extension is positioned exterior to the armrest housing in a raised, horizontal position with the bed surface in horizontal alignment with the upper horizontal surface of the armrest;
wherein the seat back, the seat bottom, the ottoman and the first armrest assembly reside in horizontal alignment to form a bed when the seat is in the horizontal bed position and the first armrest assembly is in the lower horizontal bed position;
wherein the armrest and the planar bed extension of the second armrest assembly reside in horizontal alignment with the seat back, the seat bottom, the ottoman and the armrest of the first armrest assembly when the armrest of each of the first and second armrests assemblies is in the lower horizontal bed position and the bed extension is raised.

2. The aircraft passenger suite of claim 1, further comprising partition walls defining a passenger living area, wherein the seat back, seat bottom, ottoman, armrests and bed extension cooperatively form a bed that occupies substantially the entirety of the passenger living area when the seat back, seat bottom, armrests and bed extension are in horizontal bed positions.

3. The aircraft passenger suite of claim 1, further comprising a closet positioned alongside the second armrest assembly.

4. The aircraft passenger suite of claim 1, further comprising a video monitor positioned in a partition wall forward of the seat.

5. The aircraft passenger suite of claim 1, wherein the bed extension is mounted for movement on a horizontal linear slide by which the bed extension is ejected out of a front opening of the armrest for deployment.

6. The aircraft passenger suite of claim 1, wherein each of the first and second armrests move vertically relative to their respective housings along linear slides.

7. The aircraft passenger suite of claim 1, further comprising a privacy screen slidable between an open and closed position to open and close an opening to the suite.

8. The aircraft passenger suite of claim 7, wherein the privacy screen includes lighting elements controllable to provide a desired degree of illumination and color to the privacy screen.

9. The aircraft passenger suite of claim 8, wherein the privacy screen is translucent.

10. The aircraft passenger suite of claim 1, wherein two or more like aircraft passenger suites are arranged in a nested arrangement to form a column.

11. An aircraft passenger suite comprising:
   a seat including a seat back and a seat bottom configured for movement between an upright seating position and a horizontal bed position;
   an ottoman, having a wide portion and a narrow portion, positioned apart from the passenger seat, the narrow portion serving as a foot rest when the seat is in the seating position, the wide portion serving as a secondary temporary seat when the seat is in the seating position, and both the wide portion and the narrow portion serving as a bed surface when the seat is in the horizontal bed position; and
   a first armrest assembly positioned alongside the seat, the first armrest assembly including an armrest and an armrest housing in which the armrest is mounted for movement between an upper horizontal armrest position and a lower horizontal bed position;
   wherein the seat back, the seat bottom, the ottoman and the first armrest assembly reside in horizontal alignment to form a bed when the seat is in the horizontal bed position and the first armrest assembly is in the lower horizontal bed position;
   wherein an interconnection between the armrest and a bed extension first deploys the bed extension from the armrest housing, and thereafter moves the armrest from the vertical position to the raised, horizontal position.

12. The aircraft passenger suite of claim 11, further comprising a second armrest assembly positioned alongside the seat, the second armrest assembly comprising:
   an armrest and an armrest housing in which the armrest is mounted for movement between an upper horizontal armrest position and a lower horizontal bed position; and
   a planar bed extension having an upper bed surface, and mounted in the armrest housing for movement between a stowed position wherein the bed extension is contained in a vertical position in the armrest housing and a deployed position wherein the bed extension is positioned exterior to the armrest housing in a raised, horizontal position with the bed surface in horizontal alignment with the upper horizontal surface of the armrest;
   wherein the armrest and the planar bed extension of the second armrest assembly reside in horizontal alignment with the seat back, the seat bottom, the ottoman and the armrest of the first armrest assembly when the armrest of each of the first and second armrests assemblies is in the lower horizontal bed position and the bed extension is raised.

13. The aircraft passenger suite of claim 12, further comprising a closet positioned alongside the second armrest assembly.

14. The aircraft passenger suite of claim 12, wherein each of the first and second armrests move vertically relative to their respective housings along linear slides.

15. The aircraft passenger suite of claim 11, further comprising partition walls defining a passenger living area, wherein the seat back, seat bottom, ottoman, armrests and bed extension cooperatively form a bed that occupies substantially the entirety of the passenger living area when the seat back, seat bottom, armrests and bed extension are in horizontal bed positions.

16. The aircraft passenger suite of claim 11, further comprising a video monitor positioned in a partition wall forward of the seat.

17. The aircraft passenger suite of claim 11, wherein the bed extension is mounted for movement on a horizontal linear slide by which the bed extension is ejected out of a front opening of the armrest for deployment.

18. The aircraft passenger suite of claim 11, further comprising a privacy screen slidable between an open and closed position to open and close an opening to the suite.

19. The aircraft passenger suite of claim 18, wherein the privacy screen includes lighting elements controllable to provide a desired degree of illumination and color to the privacy screen.

20. The aircraft passenger suite of claim 19, wherein the privacy screen is translucent.

21. The aircraft passenger suite of claim 11, wherein two or more like aircraft passenger suites are arranged in a nested arrangement to form a column.

22. An aircraft passenger suite including a combination bed, comprising:
   a seat including a seat back and a seat bottom that are movable between an upright seating position and a horizontal bed position;
   an ottoman, having a wide portion and a narrow portion, positioned apart from the seat, the narrow portion serving as a foot rest when the seat is in the seating position, the wide portion serving as a secondary temporary seat when the seat is in the seating position, and both the wide portion and the narrow portion serving as a bed surface for expanding a surface area of the horizontal bed position of the seat when the seat is in the horizontal bed position;
   a first armrest assembly positioned alongside the seat, the first armrest assembly including an armrest mounted for vertical movement relative to a housing, the armrest residing in horizontal alignment with the seat back and the seat bottom when the armrest is fully lowered and the seat is in the horizontal bed position; and
   a second armrest assembly positioned alongside the seat, the second armrest assembly including an armrest mounted for vertical movement relative to a housing, the armrest residing in horizontal alignment with the seat back and the seat bottom when the armrest is fully lowered and the seat is in the horizontal bed position, the second armrest assembly further including a bed extension deployable therefrom that resides in horizontal alignment with the seat back and seat bottom when the seat is in the horizontal bed position;
   wherein the seat back, seat bottom, ottoman, armrests and bed extension form a substantially continuous planar bed surface in the horizontal bed position.

23. The aircraft passenger suite of claim 22, wherein the bed extension has an upper bed surface and mounts in the armrest housing for movement between a stowed position wherein the bed extension is contained in a vertical position in the armrest housing and a deployed position wherein the bed extension is positioned exterior to the armrest housing in a raised, horizontal position.

24. The aircraft passenger suite of claim 22, further comprising a privacy screen positioned along an aisle side of the suite configured to slide between open and closed positions to provide privacy to the suite.

25. The aircraft passenger suite of claim 24, wherein the privacy screen is translucent and includes lighting elements controllable to provide a desired degree of illumination and color to the privacy screen.

26. The aircraft passenger suite of claim 22, wherein the suite is defined by a plurality of walls defining a suite living area, and wherein the seat back, seat bottom, ottoman, armrests and bed extension cooperatively form a substantially continuous, horizontal bed in a horizontal bed seating position.

27. The aircraft passenger suite of claim 22, wherein two or more like aircraft passenger suites are arranged in a nested arrangement to form a column.

28. The aircraft passenger suite of claim 22, wherein the bed extension, when deployed, fills a gap between the ottoman, seat bottom and armrest of the second armrest assembly.

29. The aircraft passenger suite of claim 22, wherein the bed extension is supported by a cantilever positioned in a coplanar position with the upper bed surface of the bed extension when stowed, and is positioned at an oblique angle in a support position under the bed extension when deployed.

\* \* \* \* \*